United States Patent [19]
Holley

[11] Patent Number: 5,971,674
[45] Date of Patent: Oct. 26, 1999

[54] DEEP HOLE DRILL BIT

[75] Inventor: Doug Holley, North Bennington, Vt.

[73] Assignee: Drill Masters of Vermont, North Bennington, Vt.

[21] Appl. No.: 09/165,250

[22] Filed: Oct. 1, 1998

Related U.S. Application Data

[60] Provisional application No. 60/060,736, Oct. 2, 1997.

[51] Int. Cl.[6] ........................................... B23B 51/02
[52] U.S. Cl. ........................... 408/59; 408/144; 408/227; 408/226; 408/705
[58] Field of Search .............................. 408/59, 144, 199, 408/227, 229, 230, 226, 705, 713

[56] References Cited

U.S. PATENT DOCUMENTS

| Re. 19,182 | 5/1934 | Emmons . |
| Re. 24,924 | 1/1961 | Willingham . |
| 348,823 | 9/1886 | Black . |
| 1,826,085 | 10/1931 | Mulock . |
| 1,847,302 | 3/1932 | Emmons . |
| 2,325,535 | 7/1943 | Nordberg . |
| 2,674,908 | 4/1954 | Willingham . |
| 2,739,496 | 3/1956 | Fleischer . |
| 2,903,921 | 9/1959 | Andreasson . |
| 2,935,906 | 5/1960 | Andreasson . |
| 2,954,712 | 10/1960 | Andreasson . |
| 3,422,706 | 1/1969 | Lunsford . |
| 3,548,688 | 12/1970 | Kuch . |
| 3,912,414 | 10/1975 | Fukura et al. ........................... 408/144 |
| 4,664,567 | 5/1987 | Edwards . |
| 4,704,055 | 11/1987 | Guhring ................................... 408/144 |

FOREIGN PATENT DOCUMENTS

| 3314349 | 10/1984 | Germany ................................ 408/144 |
| 63-260711 | 10/1988 | Japan . |

*Primary Examiner*—Daniel W. Howell
*Attorney, Agent, or Firm*—Ostrolenk, Faber, Gerb & Soffen, LLP

[57] ABSTRACT

The drill bit according to the present invention provides an advanced, carbide tipped, coolant feed, two-fluted deep hole drill capable of drilling a wider variety of materials deeper and faster than presently known drills of similar construction. Specifically, a deep hole drill bit includes a cutting tip with a fitting end having "V" shaped profile with an apex edge extending along a plane which is substantially aligned with the cutting edges of the cutting tip. The drill bit additionally includes a drill shaft having a distal end adapted to be matingly fitted to the fitting end of the cutting tip. This joint structure allows the shaft to naturally push behind the drill tip to provide enhanced strength and support during drilling. In this manner, the contact area between the drill tip and the shaft is maximized, with the contact area being greatest towards the base of the "V", where the compressive forces are also greatest, i.e., along the cutting edges.

22 Claims, 5 Drawing Sheets

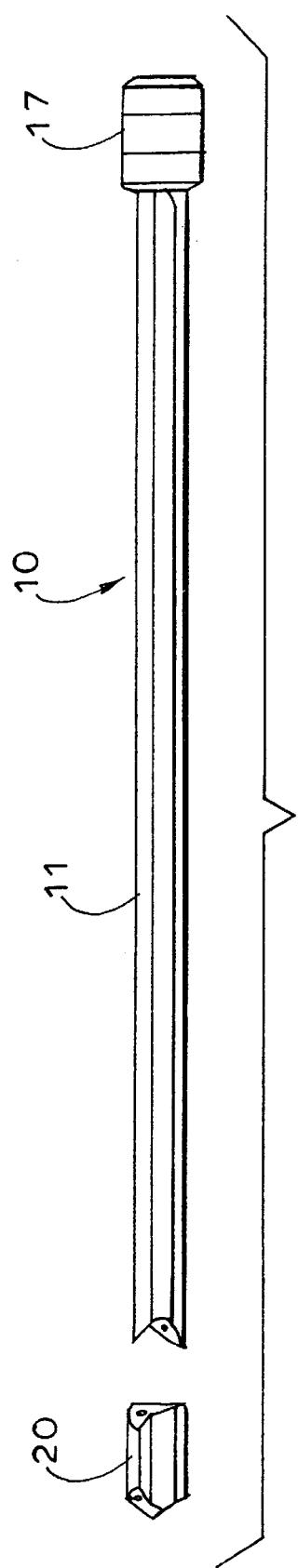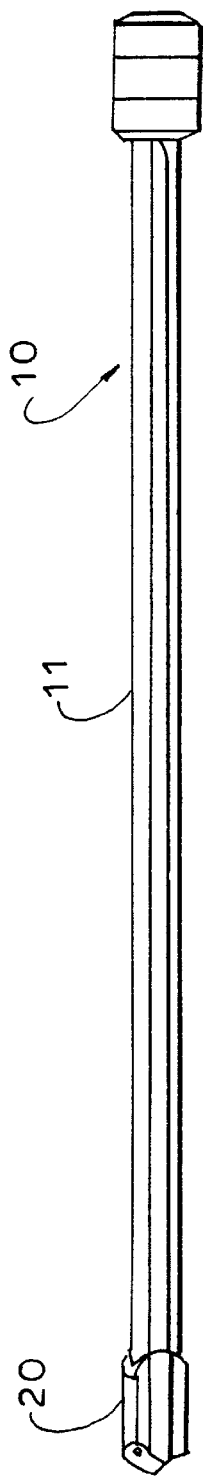
FIG. 1
FIG. 2

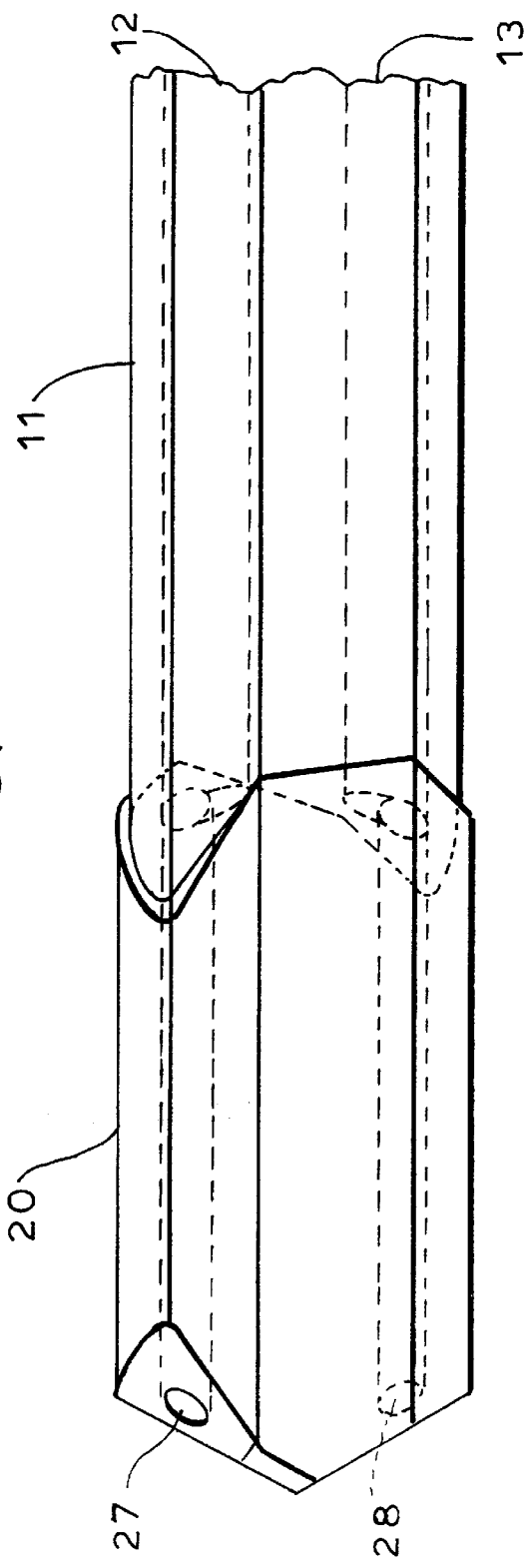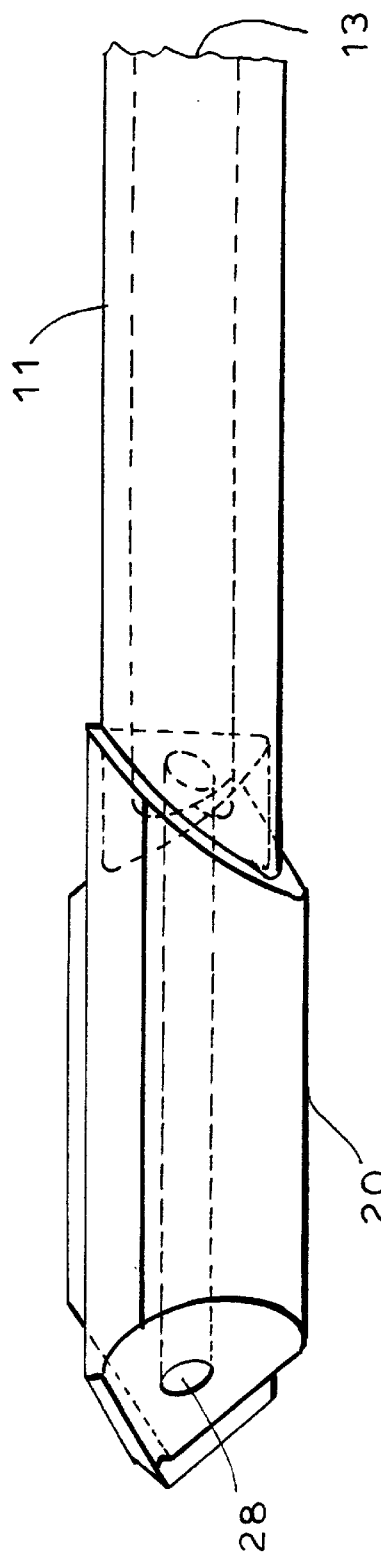

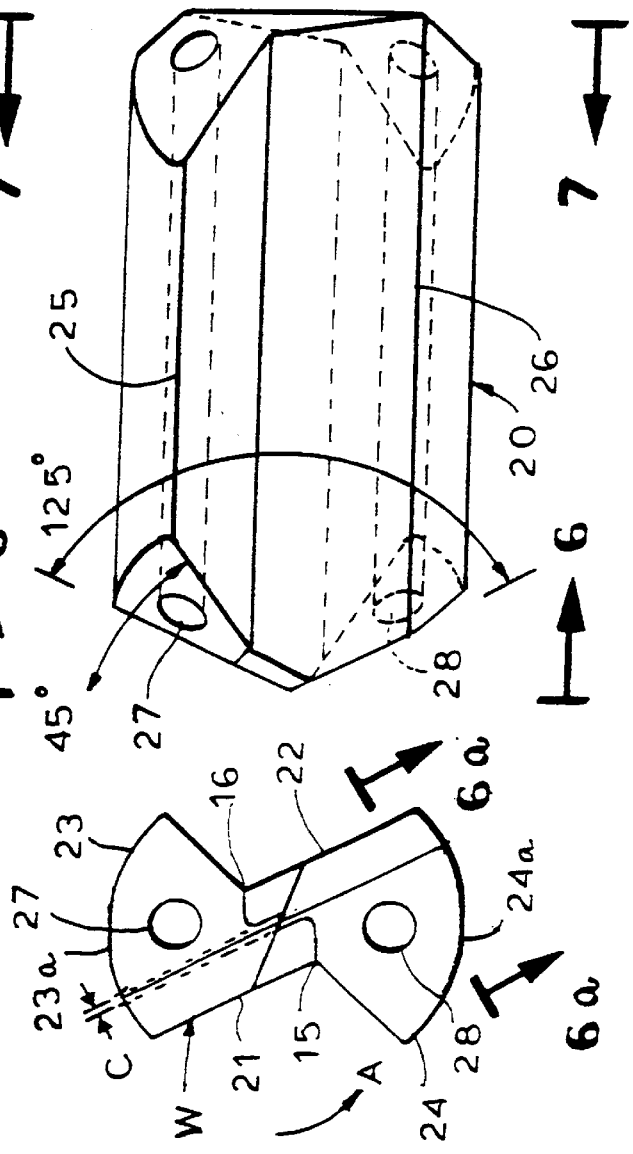

DEEP HOLE DRILL BIT

This application claims benefit of Provisional Application Ser. No. 60/060,736 filed Oct. 2, 1997.

BACKGROUND OF THE INVENTION

1. Field of the Invention

The present invention relates to a drill bit which may be used for deep hole drilling. More particularly, the drill bit includes at least one passage for through coolant, and is carbide tipped for use on a gun drilling machine, or most manual or computer controlled machine tools such as lathes, and/or milling and boring machines with stationary and/or rotary toolholders.

2. Description of the Related Art

Drilling deep holes efficiently has always been problematic in the metalworking industry. Prior art methods include the use of long twist drills of the type disclosed in U.S. Pat. No. 3,548,688. These drills must be retracted many times during the drilling process to remove chips formed as the bore is being produced.

Drill bits that provide for a coolant feeding use coolant under pressure to flush away the chips and have been found to be more effective, such as that disclosed in U.S. Pat. No. 2,954,712.

Both of the drill types mentioned above, being of steel construction, are limited to use with softer materials as harder materials severely limit tool life due to rapid wear of the tip. Furthermore, deep twist drills produce holes with inaccurate bore diameters and poor straightness and finish quality. Although the diameter tolerance of the hole may be flexible in certain applications, the prior art long twist drills may not even produce holes which meet such allowances.

Another alternative is the carbide tipped, single-flute gun drill as exemplified in U.S. Pat. No. 2,325,535. The diameter of the hole produced is often within a much better tolerance than required, due to the self-piloting and burnishing action of the tip. The single-fluted drill, formerly used exclusively on specialty built gundrilling machines, is now finding favorable applications on standard machine tools such as lathes, milling and boring machines, either manual or computer (CNC) controlled, with through tool, high pressure coolant, or air pressure and lubricant combined as a spraymist.

The single-flute gun drill method, although somewhat slow, remains as the best choice for deep holes with tight tolerances. Where hole tolerance is more flexible, however, it is desirable to provide a carbide tipped, coolant feed drill capable of drilling a wide variety of materials at a more productive feed rate.

This need has been partially addressed by two-flute, carbide tipped, coolant feed drills presently known in the art. There are currently several varieties on the market, each having similar construction with straight or helical flutes. Variants designed for deep holes all have flutes that are either milled from steel rod or central crimped tubing.

Most of the prior art two-flute drills provide a carbide tip with a thick web between the two cutting surfaces which leaves very limited clearance for chips, rendering their use to only the most free chipping ferrous and non-ferrous materials, i.e., gray cast iron, brass, or cast aluminum.

Additionally, various configurations have been designed to matingly fit the carbide tip to the distal end of the drill shaft. The contact area of these designs, however, are such that forces exerted on the brazed joint during the drilling process are concentrated on the braze material, which can result in weakening of the joint to cause separation of the shaft from the tip when used in materials which are harder than those noted above.

For example, in U.S. Pat. No. 4,664,567, and as shown in FIGS. 12 and 13 of the present disclosure, the contact surfaces between the drill tip and the drive shaft form a "V" shaped profile, wherein the planar axis of the "V" is in line with the crimp of the tube. This design produces a torque force concentrated on the braze material and thus relies on the strength of the braze material to maintain contact at the joint.

Any attempt to use the prior art carbide-tipped drills on materials which do not chip easily or on harder materials such as steel, for example, will result in failure due to heavy loading of the tip, and/or failure due to insufficient clearance in the flutes for the larger sized chips which are produced when drilling certain types of material, e.g., steel. These problems are compounded where the drill length is long and/or the operating conditions are less than ideal, i.e., worn or dull drill tip, coolant pressure too low, speed and/or feed too high, etc.

Carbide drills with more efficient grinds are generally limited to shorter length tools, typically those having a shaft length less than ten times the tip diameter (longer lengths become very costly in solid shaft construction). Even successful results obtained using shorter length drills are often achieved due to the physical strength of the drill assembly allowing for the mis-application of one or more operating parameters, i.e., less than rigid set-up, incorrect speed or feed, low coolant pressure, improper drill start, etc. When the drill shaft length is greater than ten times the tip diameter, the designs of the two-flute drills presently known in the art are so limiting that all operating conditions have to be precise to ensure a satisfactory result.

SUMMARY OF THE INVENTION

In view of the deficiencies of the prior art deep hole drills, it is an aspect of the present invention to provide a two-fluted, deep hole drill specifically designed to be usable for drilling a wide variety of materials including steels and alloys thereof.

It is another aspect of the present invention to provide a deep hole drill bit which will adequately clear away chips formed during the drilling process.

It is the further aspect of this present invention to provide a drill bit which minimizes end loading at the cutting tip.

It is yet another aspect of the present invention to provide a positive locking feature between the cutting tip and shaft which greatly enhances the joint strength, especially when the application parameters are less than ideal.

It is a still further aspect of the present invention to provide a deep hole drill bit which can be used at an accelerated feed rate over the single-fluted gun drill.

An embodiment of; the present invention provides a deep hole drill bit which includes a carbide cutting tip having a body, a cutting surface disposed at a distal end of the body, and a fitting surface disposed at the proximal end of the body, wherein the cutting surface comprises two cutting edges. The drill tip body comprises two fluid conduits extending from the cutting surface through the fitting surfaces and behind the two cutting edges viewed in the direction of rotation. Additionally, said fitting surface has a 90° "V" shaped profile with an apex edge extending along a plane which is rotated about 45° from an axis perpendicular to the two fluid conduits so as to be substantially aligned with the plane of the cutting edges. The cutting surface has a profile angle of approximately 125° and has a central web thinned to approximately one-tenth of the drill diameter, or approximately one fourth of a primary land width of one of the two cutting edges.

Other objects, features, and advantages of the present invention will become apparent from the following description of the invention which refers to the accompanying drawings.

BRIEF DESCRIPTION OF THE DRAWINGS

FIG. 1 shows a side view of a drill tip and shaft according to a preferred embodiment of the present invention.

FIG. 2 shows the embodiment of FIG. 1 with the tip portion attached to the shaft.

FIG. 3 shows an enlarged view of the tip and the distal end of the shaft as shown in FIG. 2.

FIG. 4 shows the view of FIG. 3 rotated counterclockwise by 90°.

FIG. 5 shows a side view of the drill tip according to a preferred embodiment of the present invention.

FIG. 6 shows a front view of the cutting surface of the drill tip according to the embodiment of FIG. 5.

FIG. 6a is a longitudinal cross-sectional view of the drill tip taken along a plane 6a—6a near the outer end of cutting edge 22;

FIG. 7 shows a rear view of the drill tip according to FIG. 6 which forms the joint surface with the distal surface of the shaft.

DETAILED DESCRIPTION OF THE PREFERRED EMBODIMENT

Figure 8:
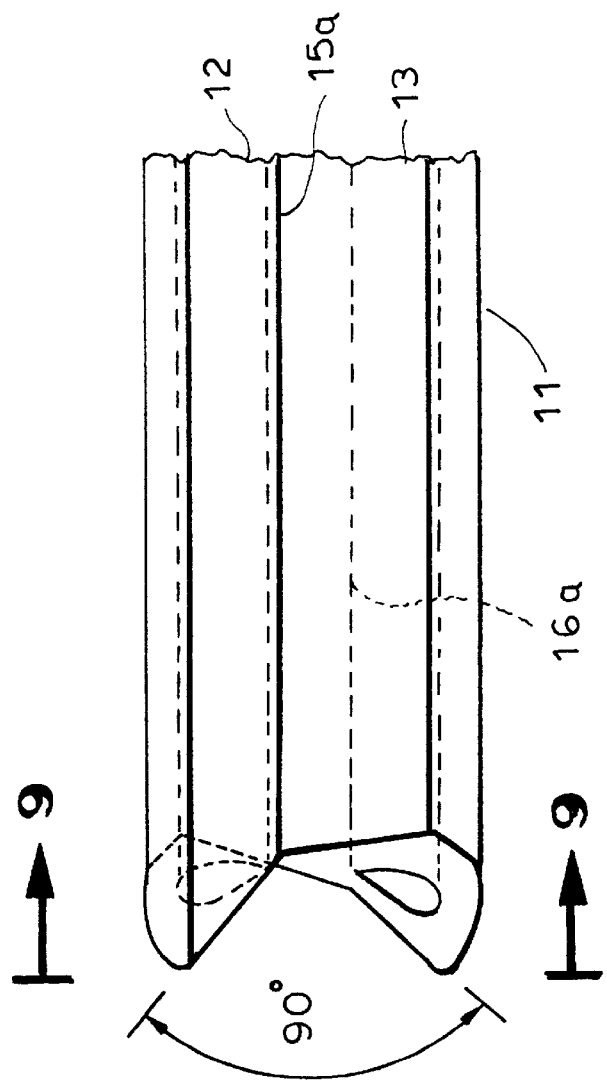
FIG. 8 shows an enlarged side view of the shaft according to a preferred embodiment of the present invention.
Figure 9:
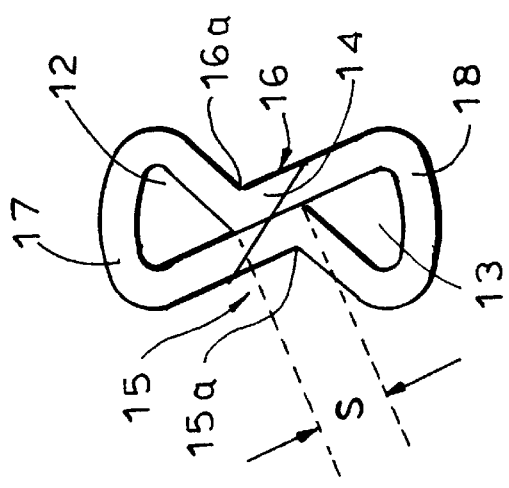
FIG. 9 shows a front view of the cross-section of the shaft end according to FIG. 8.

Referring to FIGS. 1, 2, 9 and 10, a drill tip 10 in accordance with the present invention comprises a shaft 11 formed from a tube having an originally circular cross section, made of medium carbon or alloy steel, and a driver portion 17 brazed at the proximal end of the shaft. While the length of the tubular shaft may be determined according to the specifications of the desired application, the drill bit of the present invention is particularly useful when the drill length is at least approximately ten times the diameter of the tip, described below. The driver provides means by which the drill bit may be attached to the machine toolholder and/or spindle (not shown). The tubular shaft is drawn through a die to crimp the tube in a centrally offset manner until opposite interior surfaces of the tube contact each other along the length "S" shown in FIG. 9, so as to simultaneously form a closed center section 14 and coolant passages 12 and 13.

During crimping, opposite surfaces of the tube having an originally circular cross section are indented with an edge to form dent lines 15a and 16a along the length thereof. Thus, the opposite surfaces of the closed center section 14 are in contact along length "S", as opposed to centrally crimped prior art embodiments wherein the surfaces curve toward each other at the center of the tube to meet at a tangential point of contact before curving away.

The channels along the exterior of the tube defined by the dent lines 15a and 16a form flutes 15 and 16 along which chips produced during the drilling process are flushed away with high pressure coolant or air and lubricant as spraymist introduced through fluid passages 12 and 13.

Since dent lines 15 and 16a are radially offset from one another, forces placed on each of the surfaces during drilling push each of the surfaces against the other. In this manner, the closed center 14 is able to resist forces which would otherwise tend to pull apart the contacting surfaces. Thus, the method of forming closed center section 14 as discussed above produces a sturdier and more effective drill shaft 11 than previous embodiments known in the art.

Subsequent to shaping as described above, the shaft 11 may be heat treated to provide extra strength and resistance to deformation during use.

A drill tip 20 is attached to the distal end of shaft 11 and is made from solid carbide. As can be seen from FIGS. 3–7, drill tip 20 has a cross-sectional shape similar to that of shaft 11 as described above. Drill tip 20 includes two cutting edges 21 and 22 and guide pads 23 and 24 formed on the circumferential radial surface behind the cutting edges 21 and 22, viewed with respect to the rotational direction indicated by arrow A (FIG. 6). Guide pads 23 and 24 act to maintain tip stability and alignment during the drilling process. Additionally, the cutting edges 21, 22 and the guide pads 23, 24 define voids 23a, 24a along the circumferential surface of the tip where the drill tip has slightly lesser diameter at voids 23a and 24a than at guide pads 23 and 24. Voids 23a and 24a provide for lubrication of the distal end and circumferential surfaces and are in fluid communication with conduits 12, 13 of shaft 11 and fluid conduits 25, 26 of drill tip 20 via fluid ports 27 and 28. Thus, fluid exiting the drill tip meets the chips produced immediately prior in rotation by the cutting edges to wash the chips directly into the flutes 15, 16, (and out of the bore) which follow behind the fluid port but before the next cutting edge.

As shown in FIG. 6, the drill tip is approximately cylindrically ground and relieved. The nose grind has six facets ground at 6° primary and 30° secondary angles see FIG. 6a, and a central web C thinned to approximately 10% of the tip diameter. The 6° primary facets represent the primary lands adjacent cutting edges 21 and 22, shown in FIG. 6 as having width "W", while the secondary 30° facets represent the larger surfaces of the cutting end which include fluid exit ports 27 and 28. The total angle of the cutting face is preferably approximately 125°, as shown in FIG. 5. Drill diameters are cylindrically ground to gun drill standards (0.0007" backtaper/inch) for closer tolerance work on gun-drilling machines, or to approximately 0.0015" backtaper/inch for more open tolerance work on standard machine tools. The width of central web "C", which is thinned to 10% of the drill tip diameter, is approximately ¼ that of primary land width "W" of cutting edges 21 and 22 (FIG. 6), or approximately one-half that of prior art drill tips. The thinner web reduces end loading by allowing the drill of the present invention to cut closer to the center and thus reducing the pushing force produced with prior art drills. Furthermore, a thinner point helps the drill initiate the cutting action at the start of the drilling process which facilitates use of the drill in steels and other common metals.

Figure 10:
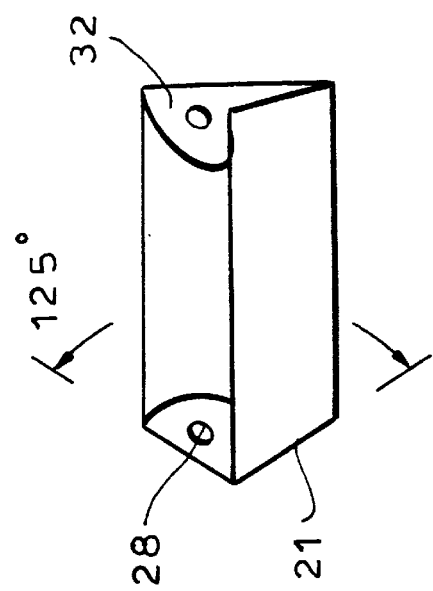
FIG. 10 shows a side view of the drill tip according to a preferred embodiment of the present invention.
Figure 11:
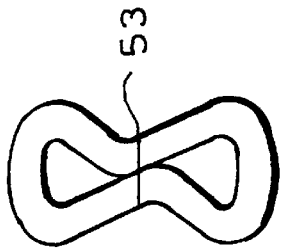
FIG. 11 shows a side view of the drill tip shown in FIG. 10 rotated counterclockwise by 90°.

The proximal surface of drill tip 20 and distal end of shaft 11 form the mating joint between drill tip 20 and shaft 11. As shown in FIGS. 10 and 11, the joint surfaces 31 and 32 meet at a 90° angle to form a "V" shaped profile which provides a large contact surface between the two pieces. The drill tip and shaft are silver brazed together at the joint surface.

Figure 12:
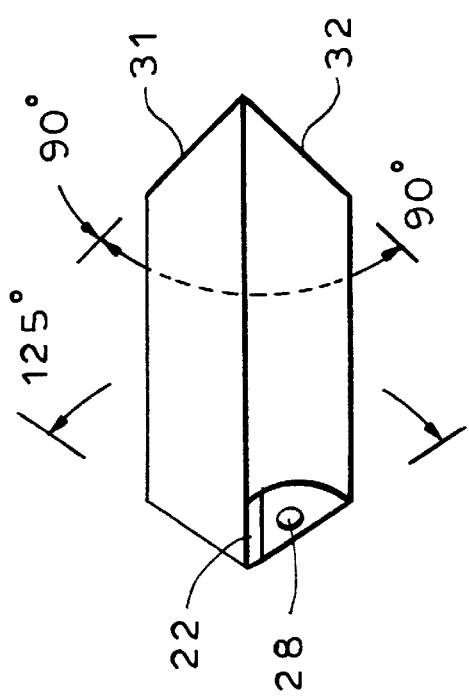
FIG. 12 shows a drill tip and shaft according to a prior art embodiment.
Figure 13:
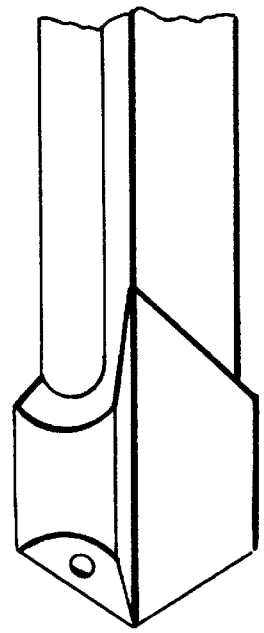
FIG. 13 shows a cross section of the prior art embodiment shown in FIG. 12.

The apex edge of the "V" is shown at reference 33 in FIG. 7. Prior art drill bits, as shown in FIGS. 12 and 13, have a "V" shaped joint area wherein the plane of the apex edge 53 is substantially normal to the cutting plane and to the fluid conduits. In the drill tip according to the present embodiment, this axis is rotated substantially 45° counter-clockwise so that joint areas 17, 18 (FIG. 9) on the shaft naturally push behind the drill tip to provide enhanced strength and support during drilling. In other words as shown in FIG. 7, the plane of the apex edge 33 of the joint is substantially aligned with the cutting edges 21, 22, such that the apex plane extends from the radially outermost point of cutting edge 21, through the center of drill tip 20, to the radially outermost point of opposite cutting edge 22. In this manner, the contact area between the drill tip 20 and the shaft 11 is maximized, with the contact area being greatest and more evenly distributed towards the base of the "V", where the compressive forces are also greatest, i.e., along the cutting edges. This unique structure represents a vast improvement over prior art joint designs, where drill failures were often experienced due to partial or complete separation of the brazed joint caused by load forces acting to separate the same.

If desired, the drill bit of the present invention may be surface coated with coatings such as Titanium Nitride (TiN), Titanium Aluminum Nitride (TiAlN), Titanium Carbo Nitride (TiCN), Chromium Carbide (CrC), or Chromium Nitride (CN), for example, to further enhance the tool life or to improve the surface finish of the hole. Additionally, the drill tip as described herein may be resharpened or replaced as necessary to extend the life of the drill, rather than replacing the entire drill assembly each time the cutting edges become worn.

While use of the prior art drills is limited to softer or free chipping materials such as cast iron or soft alloy, the enhanced joint strength of the drill according to the present invention allows the drill bit to be used in materials in which deep hole drilling was not previously feasible, e.g., alloy steels, etc. Furthermore, the drill bit of the present invention is capable of maintaining a diameter accuracy of approximately 0.002" in standard machine tool applications and better than 0.002"/inch straightness with good surface finish quality throughout the length of the bore. Even better accuracy may be attained with gun drill machines. Additionally, the advancement rate of the drill during drilling, known as the feed rate, may be increased by as much as 50 to 100% over that of similar processes presently performed with single-fluted drills.

In a demonstration of the positive engagement of the tip and tube described herein, a trial run was performed using the drill tip and shaft according to the present invention wherein the tip was disposed at the end of the shaft but leaving the joint area un-brazed. A bore of 0.5625" diameter×8" deep was successfully drilled in steel bar stock using spraymist at 80 psi. It can thus be readily seen that the present invention provides a deep hole drill which reliably performs even in less than ideal operating conditions.

In summary, the drill bit according to the present invention provides an advanced, carbide tipped, coolant feed, two-fluted deep hole drill capable of drilling a wider variety of materials deeper and faster than presently known drills of similar construction. The combination of increased flute clearance, efficient cutting nose grind, and the rotated braze joint create a unique ability to cut deep hole drilling costs over any method presently employed. The drill according to the present invention can be specifically designed to suit various manufacturing processes such as for specialty built gun drilling machines as well as lathes and milling machines, including manual or CNC controlled machines, and with through tool high pressure coolant, or spraymist systems.

Although the present invention has been described in relation to particular embodiments thereof, many other variations and modifications and other uses will become apparent to those skilled in the art. Therefore, the present invention is not limited by the specific disclosure herein.

What is claimed is:

1. A cutting tip for a deep hole drill, said cutting tip comprising:
    a body;
    a cutting surface disposed at a distal end of said body; and
    a fitting surface disposed at a proximal end of said body;
        wherein said cutting surface comprises first and second cutting edges, and
        wherein said fitting surface has a "V" shaped profile with an apex edge extending along a plane which is substantially aligned with said first and second cutting edges.

2. The cutting tip according to claim 1, wherein said apex edge extends along a plane from a radially outermost point of said first cutting edge, through a central axis of said cutting tip body, and terminating at a radially outermost point of said second cutting edge.

3. The cutting tip according to claim 1, wherein said "V" shaped profile of said fitting surface has an apex angle of approximately 90°.

4. The cutting tip according to claim 1, wherein said cutting surface has a profile angle of approximately 125°.

5. The cutting tip according to claim 1, wherein said distal end has six facets, wherein two of said six facets are ground at a 6° angle across the widths thereof, and wherein another two of said six facets are similarly ground at a 30° angle across the widths there.

6. The cutting tip according to claim 1, wherein said cutting surface further comprises a first and second cutting lands extending along and adjacent to said first and second cutting edges, respectively; and
    wherein said cutting surface further comprises a central web defined by an overlapping width of said first and second primary lands at a central location between said cutting lands, said central web having a thickness approximately one-fourth the width of either of said first and second primary lands.

7. The cutting tip according to claim 1, wherein said cutting tip body has a diameter and said cutting surface further comprises a central web disposed at a central location of said cutting surface, said central web having a thickness approximately one-tenth of said diameter.

8. The cutting tip according to claim 1, wherein said cutting tip is made from solid carbide.

9. The cutting tip according to claim 8, further comprising a layer of surface coating to enhance tool life and surface finish.

10. The cutting tip according to claim 9, wherein said surface coating is selected from TiN, TiCN, TiAlN, CrC, and CrN.

11. A cutting tip for a deep hole drill, said cutting tip comprising:

a body;

a cutting surface disposed at a distal end of said body; and a fitting surface disposed at a proximal end of said body;

wherein said cutting surface comprises first and second cutting edges, wherein said body comprises a first fluid conduit and a second conduit extending from said cutting surface through said fitting surface behind said first and second cutting edges, respectively, and wherein said fitting surface has a "V" shaped profile with an apex edge extending along a plane which is rotated substantially away from a plane perpendicular to said first and second fluid conduits.

12. A two-fluted drill bit for use in deep hole drilling, said drill bit comprising:

a drill shaft having a proximal end and a distal end, said drill shaft defining a first and second fluid passages extending from said proximal end to said distal end, said first and second fluid passages formed by crimping together opposing surfaces of a cylindrical tube at a central portion along a length thereof; and a cutting tip comprising a body, a cutting surface disposed at a distal end of said body, and a fitting surface disposed at a proximal end of said body, wherein said cutting surface comprises a first and second cutting edges, wherein said body comprises a first fluid conduit and a second conduit extending from said cutting surface through said fitting surface and in fluid communication with said first and second fluid passages, wherein said fitting surface has a "V" shaped profile with an apex edge extending along a plane which is substantially aligned with said first and second cutting edges, and wherein said distal end of said shaft is adapted to be matingly fitted to said fitting surface of said cutting tip.

13. The combination according to claim 12, wherein said apex edge extends along a plane from a radially outermost point of said first cutting edge, through a central axis of said cutting tip body, and terminating at a radially outermost point of said second cutting edge.

14. The combination according to claim 12, wherein said "V" shaped profile of said fitting surface has an apex angle of approximately 90°.

15. The combination according to claim 12, wherein said apex edge extends along a plane which is rotated 45° from a plane perpendicular to said first and second fluid conduits.

16. The combination according to claim 12, wherein said fitting surface of said cutting tip is brazed to the distal end of said shaft.

17. The combination according to claim 12, wherein said shaft is made of steel.

18. The combination according to claim 12, wherein said cutting tip is made of solid carbide.

19. The combination according to claim 12, wherein said shaft is heat treated to impart enhanced strength thereto.

20. The combination according to claim 12, wherein said shaft has a diameter and a length, and wherein said length is at least about ten times said diameter.

21. The cutting tip according to claim 11, wherein the apex edge extends along a plane which is rotated 45° from a plane perpendicular to said first and second fluid conduits.

22. The combination according to claim 15, wherein the apex edge extends along a plane which is rotated 45° from a plane perpendicular to said first and second fluid conduits.

* * * * *